G. W. BELL.
PNEUMATIC ANTIVIBRATION DEVICE FOR AUTOMOBILES.
APPLICATION FILED DEC. 23, 1918.
1,353,886.
Patented Sept. 28, 1920.
3 SHEETS—SHEET 3.
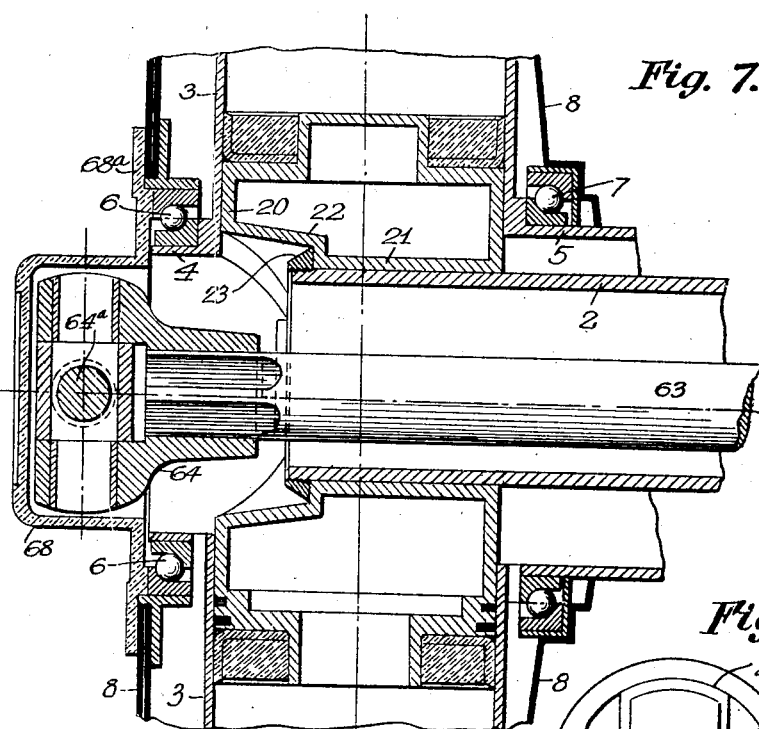
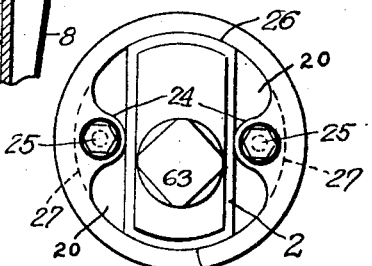
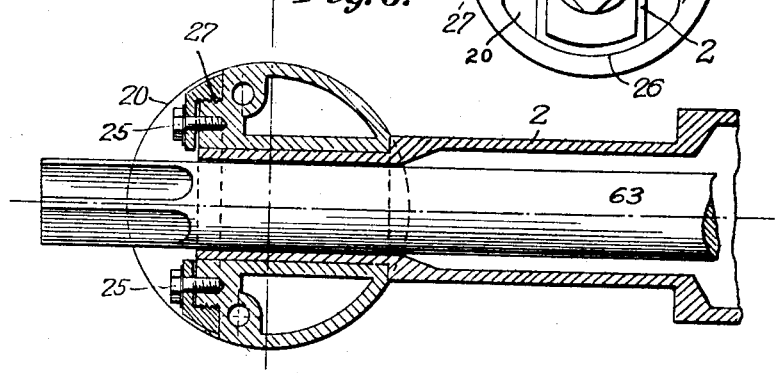
Inventor
George W. Bell,
Att'ys

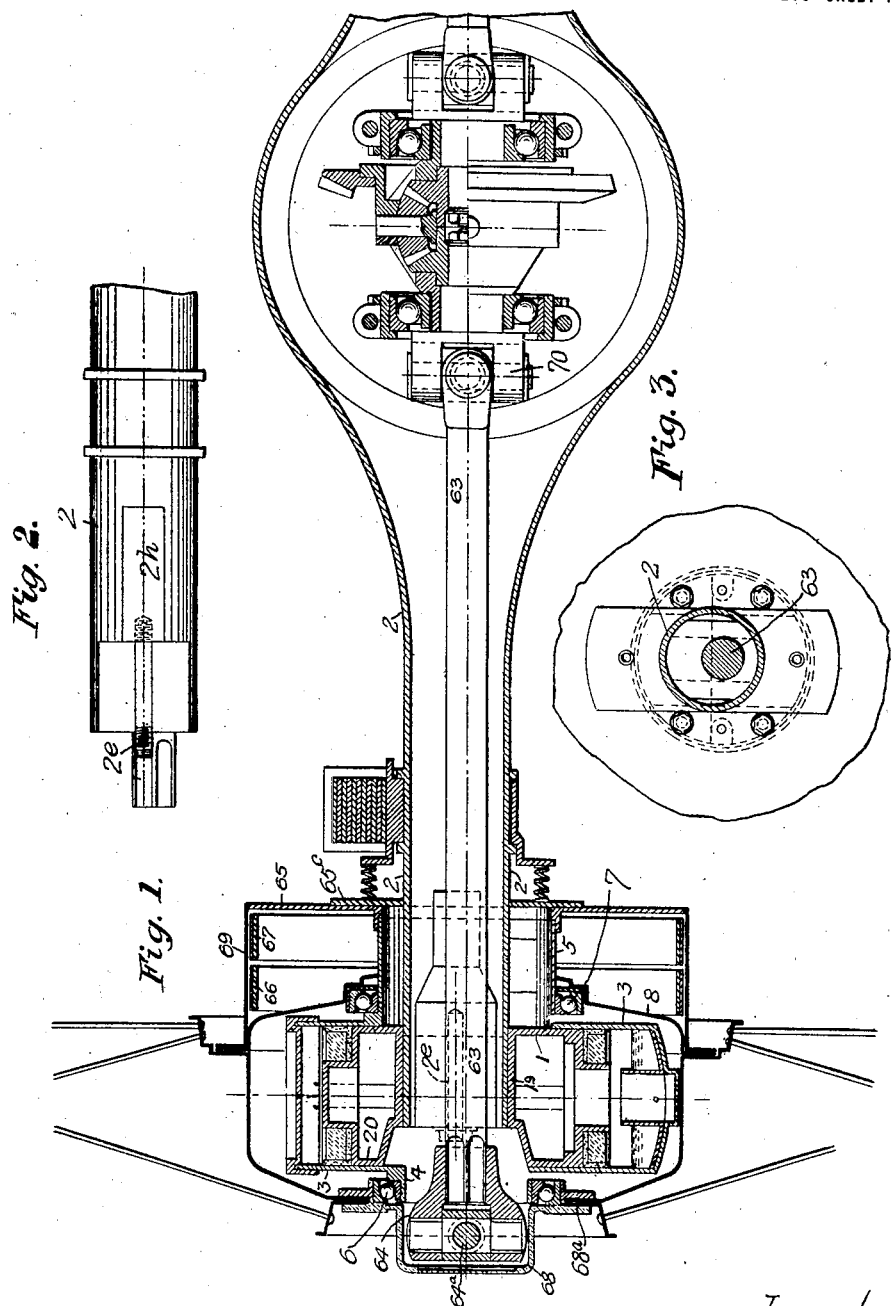

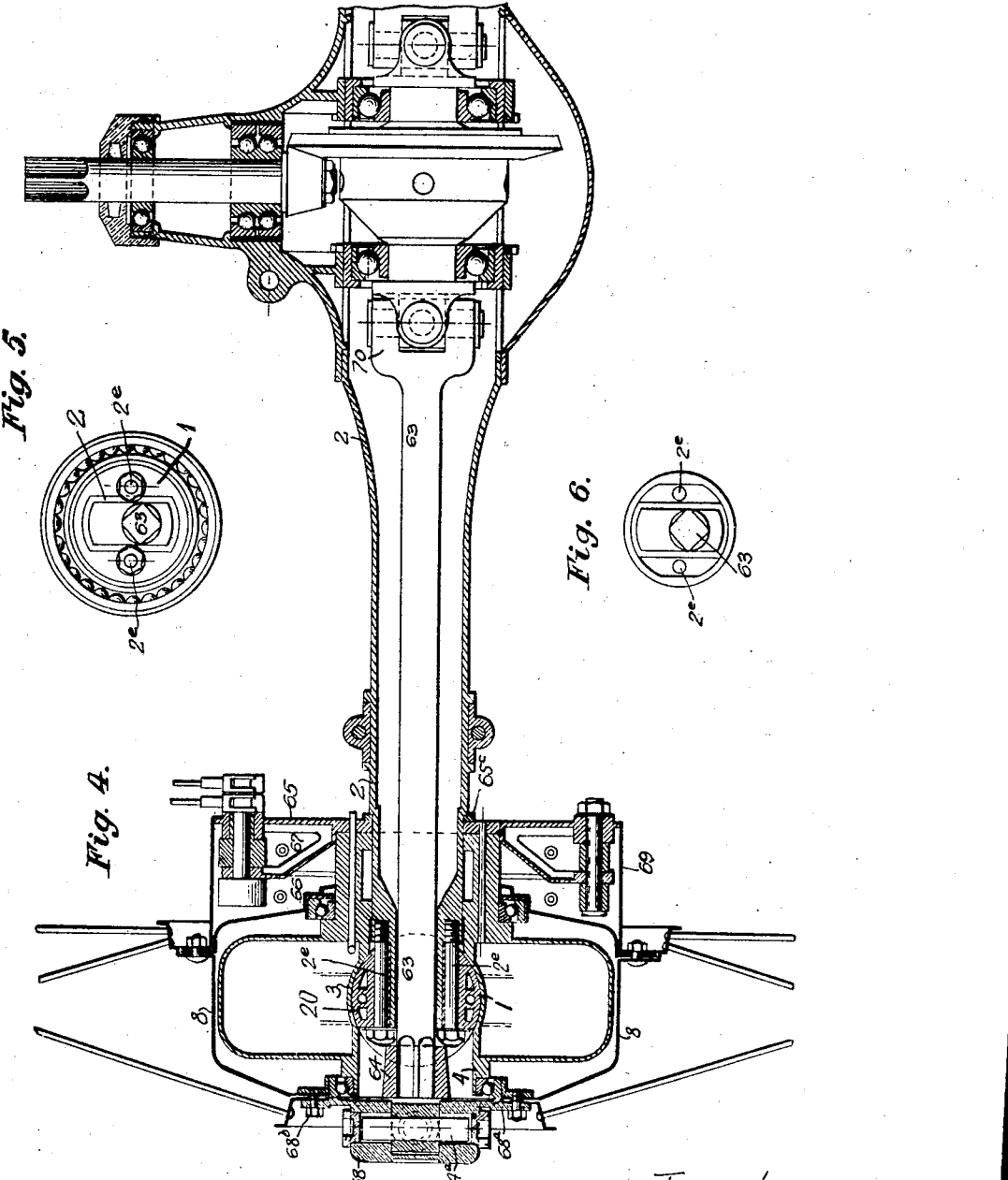

UNITED STATES PATENT OFFICE.

GEORGE W. BELL, OF DETROIT, MICHIGAN.

PNEUMATIC ANTIVIBRATION DEVICE FOR AUTOMOBILES.

1,353,886.          Specification of Letters Patent.      Patented Sept. 28, 1920.

Original application Serial No. 866,000, filed October 10, 1914. Divided and this application filed December 23, 1918. Serial No. 267,922.

*To all whom it may concern:*

Be it known that I, GEORGE W. BELL, a subject of the King of England, residing at Detroit, in the county of Wayne and State of Michigan, have invented certain new and useful Improvements in Pneumatic Antivibration Devices for Automobiles, of which the following is a specification, reference being had therein to the accompanying drawings.

This invention relates generally to pneumatic anti-vibration devices for automobiles as set forth in my application, Serial No. 866,000 for improvements in pneumatic anti-vibration devices, filed Oct. 10, 1914, and allowed June 6, 1918, (patented December 24, 1918, No. 1,288,475) of which this application is a division and specifically concerns the portion of the device therein described which lies within the hub of the traction wheel and to the arrangement of parts within the plane of the wheel whereby free oscillation is permitted in a vertical plane to the driving axle and associated portions of the mechanism.

The invention consists in the matters hereinafter set forth, and more particularly pointed out in the appended claims.

In the drawings,

Figure 1 is a view in longitudinal section on a vertical plane of a driving axle and wheel, partially broken away, provided with a pneumatic suspension or anti-vibration device that embodies features of the invention;

Fig. 2 is a view in detail of the end portion of the axle housing;

Fig. 3 is a view in cross section, partially broken away, of the axle housing;

Fig. 4 is a view in longitudinal section on a horizontal plane of the rear axle housing and pneumatic anti-vibration device;

Fig. 5 is a view in front elevation of an arm of a cylinder bearing;

Fig. 6 is a view in front elevation of the end of the axle housing;

Fig. 7 is a view in section of a piston and cylinder of a modification of the device secured in position by a ring;

Fig. 8 is a partial sectional view taken at right angles to Fig. 7; and

Fig. 9 is a view in end elevation of the axle and ring.

Referring to the drawings, and the general features of the device as a whole, an axle housing 2 carries any type of differential mechanism indicated generally in the enlarged middle portion with a universal joint 70 connecting a main driving shaft 63 or differential shaft section with the take-off members of the differential so as to permit oscillation of the shaft section in the housing. At the outer end portion of the shaft 63 a universal joint 64 connects it to the main driving hub of the wheel.

A piston 1 of the device has a transverse boss $1^c$ therethrough in which an outer flattened end portion of the housing 2 is secured by studs $2^e$ passing through the wall of the boss into the shoulder formed by the main body of the housing, the piston permitting the vertical oscillation of a cylinder 3 which has hollow guide arms 4 and 5 around the end portion of the housing with bearings 6 and 7 thereon on which the wheel hub 8 revolves. The inner arm 5 has sliding engagement with guide surfaces $2^h$ on the housing.

The interior construction of the piston and cylinder with the dash pot chambers and coöperating valve ports, do not form *per se* a portion of this invention and are therefore not described herein.

Preferably the connection between the shaft 63 and the universal joint is by means of a flattened, polygonal or keyed portion of the shaft entering a correspondingly formed recess of a part of the joint so as to permit endwise movement thereof. The other portion of the universal joint is connected by a pin $64^a$ to a cap 68 which is secured to the hub 8 of the wheel by bolts $68^b$ passing through a flange $68^a$ of the cap. The hub 8 is made in two sections and the inner portion which revolves on the bearing 7 carries a plate 65 on which brake shoes 66 and 67 are mounted to expand against the drum 69.

As will be understood, this arrangement practically places the wheel rotatable on bearings 6 and 7, with a portion of each bearing carried by cylinder 3, the latter being movable on piston 1 which is itself mounted on the housing, its boss $1^c$ being positioned on housing 2 by an endwise movement of the several parts; when so positioned bolts or studs $2^e$ are placed in position, locking the parts against endwise movement on the housing. The securing of the studs $2^e$ in position is made possible by the fact that joint 64 is movable endwise on shaft 63 and carried by and movable with cap 68, so that while cap 68 is removed from the structure, the interior parts are accessible through the outer guide arm 4. After the studs $2^e$ are secured in position, cap 68 and joint 64 are placed in position and secured by bolts $68^b$ thus locking the parts in position.

Obviously, by first removing the cap and joint 64, access can be had to studs $2^e$ to permit their disengagement, leaving the wheel structure free to be bodily removed, this being possible by moving the wheel endwise of the housing to carry boss $1^c$ off of the housing.

To fully protect the interior of the hub, a dust plate $65^c$ may be projected yieldingly against the inner face of the hub or plate 65 thereof by suitable springs as indicated.

In Figs. 7, 8 and 9 another method of securing the parts in position is shown. In this instance, a piston 20 has a central hollow boss 21 connected by a flange 22 to the outer portion of the hub so that when the axle housing 2 is inserted therein it may be secured by a thrust ring 23 screwthreaded on to the projecting portion of the housing, the counterbored recess formed by the flanged connection 22 giving clearance for the universal joint 64, which is connected as before to the cap 68 of the hub. To prevent displacement of the ring 23 the latter may be provided with lugs 24 through which studs 25 or cap screws engage the body of the piston 20. As the housing is flattened in an upright plane to enter the correspondingly shaped bore of the piston, the ring preferably engages screw-threads on the rounded faces 26 of the housing, and on the complementary projections 27 of the piston, the screwthreads being in register when the parts are in proper position. In this form, ring 23 serves to prevent endwise movement of the piston on housing 2, the threads of the ring engaging the threaded portions of housing and piston when the threads of these parts are in mating position, it being understood that in Fig. 9, the outer curved faces of housing 2 are threaded, as are the curved segmental faces 27 of the piston, these faces, when the parts are assembled, producing a screw-threaded exterior on which ring 23 is threaded. Studs 25 prevent threading movement of the ring 23. As in the other form, it is necessary only to remove studs 25, unscrew ring 23, and then withdraw the wheel bodily, cap 68 and joint 64 having been previously removed, the reverse operation being had when the wheel is being mounted.

It is thus seen that by either construction a piston and cylinder supporting device with suitable driving axle connections are had that are housed completely within the plane of the wheel. The device is readily assembled and because of its position within the bearings of the wheel, all side stress from load is obviated.

Obviously, changes in the details of construction may be made without departing from the spirit of my invention and I do not care to limit myself to any particular form or arrangement of parts.

What I claim is:—

1. In anti-vibration devices of the type set forth, a hollow axle housing, an upright piston detachably secured in the outer end portion thereof, an air cylinder in which the piston plays, bearings mounted on the cylinder, a wheel the hub of which is journaled on the bearings, an oscillatory driving shaft in the housing having universal joint connection with the wheel hub, and means for securing the wheel hub detachably on the bearings, the wheel with piston and cylinder forming a unit removable endwise from the housing.

2. In anti-vibration devices of the type described, an axle housing, differential gearing mounted therein, a piston non-rotatably secured detachably on the outer end portion of the housing, an upright cylinder oscillatory on the piston, bearings mounted on the cylinder, a wheel hub journaled on the bearings, and a drive shaft in the housing having universal joint connections with the differential mechanism and with the wheel hub, the wheel with piston and cylinder forming a unit removable endwise from the housing.

3. In anti-vibration devices of the type set forth, an axle housing, a piston secured on the outer end portion thereof through which the housing extends laterally, a cylinder reciprocable on the piston provided with hub bearings on each side, a wheel mounted on the bearings with the hub thereof enveloping the cylinder and inclosed portions of the housing, an oscillatory and rotatable driving shaft journaled in the housing and connected by a universal joint with the wheel hub for rotating the latter, and means detachably securing the wheel in position, the wheel and inclosed supporting means being removable endwise as a unit from the housing.

4. In an anti-vibration device of the character described, an axle housing, a piston mounted on the end portion of the housing, a cylinder reciprocable on the piston, a pair of bearings mounted on opposite sides of the cylinder around the housing, a wheel hub journaled thereon, a wheel hub cap detachably secured to the hub, a universal joint one member of which is pivotally secured to the cap on an axis transverse to the hub axis, a driving shaft oscillatory and rotatable in the housing and non-rotatably and detachably secured to the other part of the universal joint, the latter being removable with the cap, and means for detachably securing the wheel against endwise displacement and accessible in the cylinder when the cap is removed.

5. In an anti-vibration device of the character described, an axle housing, a piston mounted on the end portion of the housing, a cylinder reciprocable on the piston, a pair of bearings mounted on opposite sides of the cylinder around the housing, a wheel hub journaled thereon, a wheel hub cap detachably secured to the hub, a universal joint one member of which is pivotally secured to the cap on an axis transverse to the hub axis, a driving shaft oscillatory and rotatable in the housing and non-rotatably secured to the other part of the universal joint, and differential mechanism mounted in the housing and universal joint connections between the take off driving member of the differential mechanism and the driving shaft, the wheel with piston and cylinder forming a unit removable endwise from the housing.

6. In an anti-vibration device of the character described, an axle housing, a piston secured transversely on the outer end portion of the axle housing, a thrust collar on the housing extremity for securing the piston, a cylinder longitudinally reciprocable on the piston, bearings on each side of the cylinder, a hub enveloping the cylinder journaled on the bearings, a universal joint pivotally attached to the hub on an axis transverse to the housing axis, and a driving shaft oscillatory and rotatable in the housing non-rotatably secured to the universal joint to turn the hub.

7. In an anti-vibration device of the character described, an axle having a piston secured transversely on the outer end portion thereof, through which the housing extends, a cylinder reciprocable on the piston having lateral arms one of which has sliding engagement with the housing, bearings on the arms, a wheel hub journaled on the bearings, means accessible through the other arm for securing the piston on the housing, a driving shaft oscillatory and rotatable in the housing, and a detachable hub cap having a universal driven joint detachably secured to the shaft.

In testimony whereof I affix my signature in the presence of two witnesses.

GEORGE W. BELL.

Witnesses:
ANNA M. DORR,
CHAS W. STAUFFIGER.